United States Patent Office 2,956,978
Patented Oct. 18, 1960

2,956,978

POLYALKYLENE GLYCOL DIBENZOATES, PROCESS OF MAKING SAME AND RESINOUS COMPOSITIONS PLASTICIZED THEREWITH

Howard F. Reeves, Jr., Raymond W. Ingwalson, and John L. Rose, Jr., Chattanooga, Tenn., assignors to Tennessee Products and Chemical Corporation, Nashville, Tenn., a corporation of Tennessee No Drawing. Filed July 30, 1953, Ser. No. 371,423

29 Claims. (Cl. 260—31.4)

This invention relates to compositions of matter having unusual utility in plasticizing resinous compositions, particularly polyvinyl chloride and copolymers, vinyl chloride and vinyl acetate and the like. More particularly, this invention relates to polyalkylene glycol dibenzoates such as dipropylene glycol dibenzoate, a process of making the same and resinous compositions plasticized therewith.

Generally, in selecting a compound which would be suitable as a plasticizer, the compound selected should have a high boiling point, low volatility, a low freezing point, a mild or pleasant odor, or no odor at all, be compatible with resinous compositions and be non-toxic. A plasticizer should also be of light color or be colorless, and comprise the proper degree of polarity.

In the past, dibenzoates of ethylene glycol, diethylene glycol, and triethylene glycol have been synthesized. The latter two compounds possess certain characteristics such as high boiling points, good stability, practically no odor and good compatibility with certain resins, which makes them desirable as plasticizers. On the other hand, the above members of this series are solids at room temperature; thus, it would normally be expected that if a process were devised for producing the higher members of this glycol series, they would also be solids at room temperature. The dibenzoate of diethylene glycol has another disadvantage in that it has the rare quality of possessing two distinct freezing points, namely 17.2° C. and 29.1° C., the latter freezing point form being the more stable.

In general, it is very undesirable for a plasticizer to have a high freezing point where low temperature flexibility is of importance in the finished plastic item. In addition, solid plasticizers often incur handling difficulties from the standpoint of having to melt large containers of the frozen item. Certain resin compositions are prepared, stored, shipped and used as liquid dispersions of fine resin solids in a plasticizer. When these materials freeze, they must be melted with extreme caution as excessive heat will cause premature gelatin and solidification and result in complete loss of material.

In the prior art production of glycol esters, the glycol is reacted with an organic acid in the presence of a hydrogen ion catalyst, the following reaction being typical:

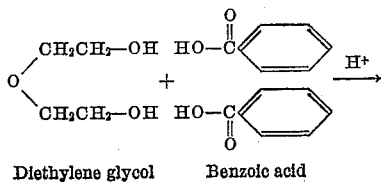

Diethylene glycol    Benzoic acid

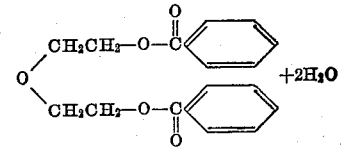

Diethylene glycol dibenzoate

A secondary reaction takes place that splits or decomposes the product to some extent to yield:

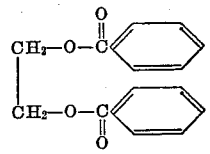

Ethylene glycol dibenzoate

In order to accomplish the above reaction in a reasonable period of time, heat is usually applied to the reactants. In this instance, the presence of the catalyst, sulfuric acid or toluene sulfonic acid, in the reaction zone, discolors the esters to a straw or dark color. It has been found that the esters produced according to the above process do not lend themselves well to conventional bleaching treatments and thus, controlled fractional distillation of the resulting esters is substantially the only way to obtain a pure light colored product.

In general, even if heat is applied, the reaction described above proceeds slowly and the esters tend to darken as the reaction proceeds. When using dipropylene glycol in the above reaction, we have found it necessary, to accept esterification in the neighborhood of 50% of the theoretical, in order to obtain a reasonably light colored ester. After about ten hours and when approximately 80% of the theoretical water is removed, the esterification reaction stops and the resulting black viscous material which remains in the reaction zone is unacceptable as a plasticizer.

To overcome the disadvantages inherent in the process heretofore described, the classic Schotten and Baumann reaction has been used in the prior art. In this Schotten and Baumann method, poor yields are to be expected; since, in the reaction the benzoyl chloride hydrolyzes to benzoic acid; thus, yields of desired esters in the neighborhood of 65% of theoretical yield would be considered good. The resulting ester from this process usually has an off-color and odor, and will, in most instances, contain half-esters which are extremely difficult and in some instances impossible to separate.

The use of pyridine in combination with an aroyl chloride and a hydroxy compound has been proposed; however, this procedure does not lend itself to large scale production of low cost esters since the pyridine is prohibitive in cost.

By both of the above described prior art methods, it is extremely difficult, if not impossible, in most instances, to produce anything more than nominal quantities of a secondary glycol ester, i.e. an ester from a glycol in which the hydroxy group is attached to a saturated carbon atom in the chain, the carbon containing only one hydrogen atom.

It is a primary object of our invention to provide plasticizers which have the advantages of the prior art plasticizers and substantially none of the disadvantages thereof.

Another object of our invention is to provide new compositions of matter.

Another object of our invention is to provide a new process of producing glycol esters which process will provide high yields in substantially short periods of time.

Another object of our invention is to provide a practical and inexpensive process for producing esters of glycols containing secondary hydroxyl groups.

Another object of our invention is to provide a process of producing substantially pure polyalkylene glycol esters.

Another object of our invention is to provide superior plasticized resinous products.

Other and further objects and advantages of our invention will become apparent from the following description of embodiments thereof.

Contrary to prior art beliefs and practices, we have been able, through a new process, to produce dibenzoates of glycols which are liquids at room temperature and have unusual properties as plasticizers. According to our invention, these dibenzoates of glycols are produced by intimately contacting a polyalkylene glycol with an aroyl halide in substantially equivalent proportions. When commingled, the aroyl halide reacts with all of the hydroxy groups of the glycol and through the evolution of hydrogen halide, which leaves or is withdrawn from the reaction zone substantially at the rate at which it is formed, substantially complete esterification of the glycol is accomplished. Heat may be applied to the reactants to increase the speed of reaction and it is recommended that the reactants be maintained at a temperature of from 80° C. to 125° C. Below approximately 50° C. the reaction proceeds extremely slowly and above about 175° C. there is a tendency for part of the aroyl halide to be volatilized with the hydrogen halide. If desired, the reaction zone may be evacuated to induce removal of the hydrogen halide. In event that either heat or vacuum is applied to the reaction zone, it may be found desirable to provide a reflux condenser to return the somewhat volatile aroyl halide to the reaction zone.

Generally, a mole ratio depending on the number of hydroxy groups should be established even though an excess of aroyl halide may be found desirable. It is also preferable to add the glycol to the aroyl halide since the halide impurities in the resulting product are diminished thereby. Further, if large amounts of the glycol are added to the relatively warm chemicals in the reaction zone, there is a tendency for the aroyl halide to be entrained with the hydrogen halide and to be carried from the reaction zone therewith. After the esterification reaction is completed and if no vacuum is used during the reaction, small amounts of hydrogen halide gas may be present in the ester and may be removed therefrom by evacuating the reaction zone while agitating the ester. To remove traces of the hydrogen halide and the aroyl halide, the ester may then be washed in a mild aqueous alkaline bath. The glycol esters produced according to our invention are insoluble in and heavier than water, thus these esters may be subjected to many alkaline or water washes if desired.

A good yield may also be accomplished by mixing the glycol with aroyl halide, at a temperature below which these reactants will react and then feeding small increments of the thoroughly commingled reactants into a reaction zone where they are heated and reacted. In this event, the hydrogen halide is withdrawn as described heretofore.

The esterification reaction described above may be illustrated as follows:

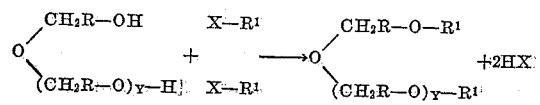

where R represents an alkylene group or groups, such as methylene, ethylene, ethylidene, etc. and Y represents any interger from 0 up, while X represents a halogen, and $R^1$ represents an aroyl group or groups or a substituted aroyl group or groups, for example benzoyl or chlorobenzoyl. It has been found that molecules where Y is as high as 15 from suitable plasticizers.

Substituting in the above formula, a dipropylene glycol dibenzoate may be made from dipropylene glycol and benzoyl chloride; the reaction being as follows:

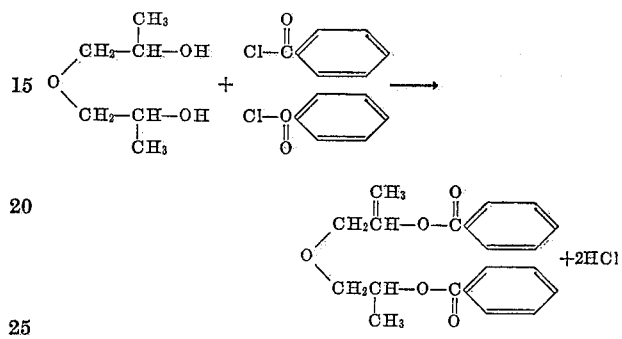

Further, tripropylene glycol dibenzoate may be made from tripropylene glycol and tetra propylene glycol dibenzoate may be made from tetra propylene glycol, etc. Mixtures of these glycols, as they occur in commerce, work very smoothly in the above reaction to yield esters useful as plasticizers. Thus, the new compounds which we have devised may be expressed as:

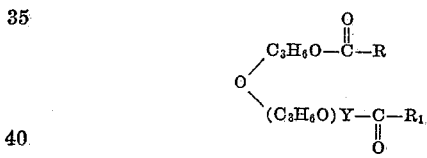

where Y represents an integer of 1 to 15 and R and $R_1$ represent phenyl or chlorine substituted phenyl. It is equally obvious that the dibenzoates of higher polyethylene glycols or mixtures thereof can be made by the above reaction. Instead of benzoyl halide, one may use chlorobenzoyl halides such as meta, ortho, para, 2-4 dichloro, 3-5 dichloro benzoyl halide or mixtures thereof. Also, other substituted benzoyl halides such as methyl-, ethyl-, nitro-, etc. benzoyl chlorides may be used with such mixtures as benzoyl chloride and chlorobenzoyl chloride yielding products of improved properties.

In the above reaction, using a benzoyl chloride or a substituted benzoyl chloride, over 90% of theoretical hydrogen chloride is evolved as a pure gas and can be readily recovered as a by-product by any prior art method.

Details of the practice of this invention are set forth with respect to the following examples:

EXAMPLE I

Ten moles of diethylene glycol (1061.2 grams) were added over an eighty-eight minute period to 20.2 moles (3536 grams) of metachlorobenzoyl chloride at 98–105° C. in a three-necked five liter flask equipped with an agitator, a thermometer, a reflux condenser and a dropping funnel, the diethylene glycol being added through the dropping funnel as the chlorobenzoyl chloride was agitated. The hydrogen chloride gas which formed during the reaction passed through the reflux condenser and was trapped in water. After all of the diethylene glycol was added, stirring was continued for 2¼ hours and the temperature of the chemicals within the flask was maintained between 97–135° C. The product was next given an alkaline wash (20% $Na_2CO_3$ and water) followed by a water wash. The yield, diethylene glycol bis-meta-chlorobenzoate, a water white liquid was 96.5% of the theoretical.

EXAMPLE II

Ten moles of diethylene glycol (1061.2 grams) were added over an 1¼ hour period to a mixture of 10.1 moles (1776 grams) of chlorobenzoyl chloride and 10.1 moles (1423 grams) of benzoyl chloride at 105–110° C. in a three-necked five liter flask equipped with an agitator, a thermometer, a reflux condenser and a dropping funnel, the diethylene glycol being added through the dropping funnel as the chlorobenzoyl chloride and benzoyl chloride were agitated. The hydrogen chloride gas which formed during the reaction passed through the reflux condenser and was trapped in water. After all of the diethylene glycol was added, stirring was continued for 4½ hours and the temperature of the chemicals within the flask was maintained between 106–150° C. The product was next given an alkaline wash (20% $Na_2CO_3$ and water followed by a water wash. The product was a water white liquid and consisted of a mixture of diethylene glycol dibenzoate, diethylene glycol bis-meta-chlorobenzoate and diethylene glycol benzoate-meta-chlorobenzoate. The yield was 97.5% of the theoretical based on diethylene glycol.

EXAMPLE III

Four moles of diethylene glycol (424.5 grams) were added over a forty-two minute period to 8.16 moles (1146 grams) of benzoyl chloride at 100–107° C. in a three-necked two liter flask equipped with an agitator, a thermometer, a reflux condenser and a dropping funnel, the diethylene glycol being added through the dropping funnel as the benzoyl chloride was agitated. The hydrogen chloride gas which formed during the reaction passed through the reflux condenser and was trapped in water. After all of the diethylene glycol was added, stirring was continued for five hours and the temperature of the chemicals within the flask was maintained at 102–140° C. The product was next given an alkaline wash (20% $Na_2CO_3$ and water) followed by a water wash. The yield of diethylene glycol dibenzoate, a water white liquid was 98.5% of the theoretical yield.

EXAMPLE IV

Four moles of dipropylene glycol (536.8 grams) were added over a one and one-half hour period to 8.16 moles (1150 grams) of benzoyl chloride at 109–125° C. in a three-necked three liter flask equipped with an agitator, a thermometer, a reflux condenser and a dropping funnel, the dipropylene glycol being added through the dropping funnel as the benzoyl chloride was agitated. The hydrogen chloride gas which formed during the reaction passed through the reflux condenser and was trapped in water. After all of the dipropylene glycol was added, stirring was continued for 3 hours and the temperature of the chemicals within the flask was maintained between 100–135° C. The product was next given an alkaline wash (20% $Na_2CO_3$ and water) followed by a water wash. The yield of dipropylene glycol dibenzoate, a water white liquid, was 97% of the theoretical yield.

EXAMPLE V

Three moles of polyethylene glycol (600 grams, average molecular weight 200) were added over a period of twenty-five minutes to 6.12 moles (857 grams) of benzoyl chloride at 104–130° C. in a three-necked two liter flask equipped with an agitator, a thermometer, a reflux condenser and a dropping funnel, the polyethylene glycol being added through the dropping funnel as the benzoyl chloride was agitated. The hydrogen chloride gas which formed during the reaction passed through the reflux condenser and was trapped in water. After all of the polyethylene glycol was added, stirring was continued for 3 hours and the temperature of the chemicals within the flask was maintained between 104–140° C. The product was next given an alkaline wash (20% $Na_2CO_3$ and water) followed by a water wash. The yield of polyethylene glycol dibenzoate, a water white liquid, was 96% of the theoretical yield.

EXAMPLE VI

Two moles of polyethylene glycol (400 grams, average molecular weight of 200 grams) were added over a one-hour period to 4.1 moles (718 grams) of meta-chlorobenzoylchloride at 96–126° C. in a three-necked two liter flask equipped with an agitator, a thermometer, a reflux condenser and a dropping funnel, the polyethylene glycol being added through the dropping funnel as the meta-chlorobenzoyl chloride was agitated. The hydrogen chloride gas which formed during the reaction passed through the reflux condenser and was trapped in water. After all of the polyethylene glycol was added, stirring was continued for four and one-half hours and the temperature was maintained between 96–138° C. The product was next given an alkaline wash (20% $Na_2CO_3$ and water) followed by a water wash. The yield of polyethylene glycol bis-meta-chlorobenzoate, a water white liquid, was 95% of the theoretical yield.

EXAMPLE VII

One mole of polyethylene glycol (300 grams, average molecular weight of 300 grams) was added over a forty-two minute period to 2.04 moles (287 grams) of benzoyl chloride at 86–91° C. in a three-necked one liter flask equipped with an agitator, a thermometer, a reflux condenser and a dropping funnel, the polyethylene glycol being added through the dropping funnel as the benzoyl chloride was agitated. The hydrogen chloride gas which formed during the reaction passed through the reflux condenser and was trapped in water. After all of the polyethylene glycol was added, stirring was continued for three hours and the temperature was maintained between 86–135° C. The product was next given an alkaline wash (20% $Na_2CO_3$ and water) followed by a water wash. The yield of polyethylene glycol dibenzoate, a water white liquid, was 97% of the theoretical yield.

EXAMPLE VIII

One mole of polyethylene glycol (400 grams, average molecular weight of 400 grams) was added over a one hour period to 2.04 moles (287 grams) of benzoyl chloride at 95–100° C. in a three-necked one liter flask equipped with an agitator, a thermometer, a reflux condenser and a dropping funnel, the polyethylene glycol being added through the dropping funnel as the benzoyl chloride was agitated. The hydrogen chloride gas which formed during the reaction passed through the reflux condenser and was trapped in water. After all of the polyethylene glycol was added, stirring was continued for three hours and the temperature was maintained between 97–136° C. The product was next given an alkaline wash (20% $Na_2CO_3$ and water) followed by a water wash. The yield of polyethylene glycol dibenzoate, a water white liquid, was 96% of the theoretical yield.

Dibenzoates of glycols having a molecular weight from approximately 200 to approximately 700 are substantially water white liquids at room temperature, the physical characteristics of some of these esters being listed below.

Table I
PHYSICAL CONSTANTS

| Sample (names below) | 1 | 2 | 3 | 4 | 5 | 6 | 7 |
|---|---|---|---|---|---|---|---|
| Boiling Point, °C | 235 @ 5 mm | 253 @ 4 mm | | range @ 1 mm. 225–285 | d. above 300 @ 1.6 mm | range @ 2.5 mm. 224–300 d. | d. above 300 @ 2.3 mm. |
| Freeze Point, °C | glass @ −40° | glass @ −25° | below −35° | glass @ −40° | glass @ −35° | glass @ −50° | glass @ −48°. |
| $N_D^{25}$ C | *1.5300 | 1.5383 | 1.5481 | 1.5252 | 1.5379 | 1.5137 | 1.5077. |
| Sp. Gr. @ 25° C | *1.1245 | 1.2354 | 1.2359 | 1.1579 | 1.2632 | 1.1499 | 1.1452. |
| Sap. No | 323 | 274.6 | 319.9 | 263.9 | 240.8 | 215 | 182.4. |
| Acidity, mg. KOH/g. Ester | 0.76 | | 0.27 | 0.20 | | 0.44 | 0.16. |
| Viscosity, cps. @ 25° C | *204 | 700 | 146 | 101 | 312 | 130 | 167. |
| Flash Point, °C | | 250 | 236 | 248 | 277 | 258 | 254. |

*Taken at 20° C.
1. Dipropylene glycol dibenzoate.
2. Dipropylene glycol bis-chlorobenzoate.
3. Mixture of diethylene glycol dibenzoate, diethylene glycol bis-chlorobenzoate and diethylene glycol benzoate-chlorobenzoate.
4. Dibenzoate of polyethylene glycol (molecular weight 200).
5. Bis-chlorobenzoate of polyethylene glycol (molecular weight 200).
6. Dibenzoate of polyethylene glycol (molecular weight 300).
7. Dibenzoate of polyethylene glycol (molecular weight 400).

The glycol esters produced according to our process were generally found to be compatible with and to plasticize various resins such as water insoluble vinyl resins, water insoluble cellulose esters and water insoluble cellulose ethers, the compatibility with specific products being shown in Table II.

Table II
COMPATIBILITY

| Sample (names below) | 1 | | 2 | | 3 | |
|---|---|---|---|---|---|---|
| | 1:1 | 3:1 | 1:1 | 3:1 | 1:1 | 3:1 |
| Ratio of resin to: | | | | | | |
| Polyvinyl Chloride | C | | C | | C | |
| Polyvinyl Acetate | C | | C | | C | |
| Vinyl Chloride-Acetate Co-polymer | C | | C | | C | |
| Cellulose Acetate | | C | | C | | C |
| Cellulose Butyrate | C | | C | | C | |
| Cellulose Acetate-Butyrate | C | | C | | C | |
| Cellulose Nitrate | C | | C | | C | |
| Ethyl Cellulose | C | | C | | C | |
| Polystyrene | C | | C | | C | |

1. Dipropylene glycol dibenzoate.
2. Dipropylene gylcol bis-chlorobenzoate.
3. Mixture of diethylene glycol dibenzoate, diethylene glycol bis-chlorobenzoate and diethylene glycol benzoate-chlorobenzoate.

In addition to the above tabulated resins, the esters as listed in Table II have plasticizing properties when in admixture with rubber hydrochloride, butadienestyrene copolymers, polymethyl methacrylate, dicarboxylic acid and glycol condensation products and modifications thereof, and higher molecular weight polymers of isobutylene.

Dipropylene glycol dibenzoate having the empirical formula $C_{20}H_{22}O_5$, a molecular weight of 342.3, and a refractive index of 1.53 was tested as a plasticizer by forming films of plastic material containing 100 parts of resin to 50 parts of plasticizer. Using dioctyl phthalate as a standard, under identical conditions, the results are as follows:

PLASTICIZED FILM TEST

| With | Polyvinyl Chloride | | Copolymer of Vinyl Chloride and Vinyl Acetate | |
|---|---|---|---|---|
| | DPGDB | DOP | DPGDB | DOP |
| Tensile Strength | 3,434 | 2,336 | 2,800 | 2,000 |
| Modulus | 2,100 | 1,606 | 1,480 | 900 |
| Elongation, percent | 385 | 330 | 330 | 320 |
| Shore Hardness | 90 | 85 | | |

In the above film test, DPGDB represents dipropylene glycol dibenzoate while DOP represents dioctyl phthalate. The dipropylene glycol dibenzoate produced according to our invention and incorporated with a clear plastic as a plasticizer provides a clear translucent flexible film which requires very low temperature for the film to become brittle. In forming a plasticized film, dipropylene glycol dibenzoate exhibits remarkable compatible characteristics as disclosed by Table II hereof, and should preferably comprise approximately 30% to approximately 40% of the entire weight of the plastic film; however, with as little as 10% of the dipropylene glycol dibenzoate incorporated with a plastic, the plastic becomes pliable, while "sweating out" of the ester does not occur until the plastic film comprises approximately 80% dipropylene glycol dibenzoate. Cellulose acetate films containing 30% by weight of dipropylene glycol dibenzoate are clear, transparent, free of oiliness and are flexible. Ethyl cellulose films containing 30% by weight of dipropylene glycol dibenzoate are exceptionally tough and do not craze or crack on flexing. Dipropylene glycol dibenzoate can be advantageously used in nitrocellulose compositions either alone or in admixture with other plasticizers and stabilizers. Rubber hydrochloride film containing 30% dipropylene glycol dibenzoate is flexible and has good light stability properties. Other liquid glycol dibenzoates produced according to our invention exhibit similar properties.

It will be obvious to those skilled in the art that many variations may be made in the embodiments chosen for purpose of illustration without departing from the scope of our invention as defined by the appended claims.

We claim:

1. Process of preparing a substantially pure ester consisting of heating at reaction temperature of above 50° C. and below 175° C. a polyalkylene glycol selected from the group consisting of polyethylene and polypropylene glycols with sufficient aroyl halide selected from the group consisting of benzoyl halide and chlorine substituted benzoyl halide to react with substantially all hydroxyl groups, and removing hydrogen halide formed by the reaction from the reaction zone at substantially the rate it is formed until the glycol is substantially completely esterified.

2. The process in claim 1 wherein the esterified glycol is washed with an aqueous alkaline solution to remove any residual hydrogen halide and reacted aroyl halide.

3. Process of preparing substantially pure benzoate esters of polyalkylene glycols consisting of mixing a glycol selected from the group consisting of polyethylene glycols and polypropylene glycols with a benzoyl chloride at temperatures below which reaction takes place and continuously feeding this mixture to a heated zone maintained at a temperature above 50° C. and below 175° C. where reaction takes place and hydrogen chloride is removed from the reaction system, removing the esters and washing with an aqueous alkaline solution to remove hydrogen chloride and unreacted benzoyl chloride.

4. Process of preparing substantially pure dipropylene glycol benzoate esters consisting of heating a benzoyl chloride at a reaction temperature of above 50° C. and below 175° C. with dipropylene glycol, removing hydrogen chloride by evaporation at substantially the rate it is formed and washing said esters formed thereby with an aqueous alkaline solution to remove residual hydrogen chloride and unreacted benzoyl chloride.

5. The process in claim 4 wherein the benzoyl chloride in chlorobenzoyl chloride.

6. Process of preparing substantially pure tripropylene glycol benzoate esters comprising heating benzoyl chloride at reaction temperature of 80°–150° C. with tripropylene glycol, removing hydrogen chloride by evaporation at substantially the rate it is formed and washing said ester with an aqueous alkaline solution to remove residual hydrogen chloride and unreacted benzoyl chloride.

7. Process of preparing substantially pure diethylene glycol benzoate esters consisting of heating benzoyl chloride at reaction temperature of 80°–150° C. with diethylene glycol, removing hydrogen chloride by evaporation at substantially the rate it is formed and washing said ester with an aqueous alkaline solution to remove residual hydrogen chloride and unreacted benzoyl chloride.

8. Process of preparing substantially pure polyethylene glycol benzoate esters consisting of heating benzoyl chloride at reaction temperature of 80°–150° C. with polyethylene glycol, removing hydrogen chloride by evaporation at substantially the rate it is formed and washing said ester with an aqueous alkaline solution to remove residual hydrogen chloride and unreacted benzoyl chloride.

9. Process of preparing an ester suitable for use as a plasticizer consisting of heating to a temperature of above 50° C. and below 175° C. a benzoyl halide, adding a polyalkylene glycol selected from the group consisting of polyethylene and polypropylene glycols to said benzoyl halide while maintaining said temperature, removing gaseous hydrogen halide formed by the reaction from the reaction zone at substantially the rate it is formed, agitating said benzoyl halide during the addition of said polyalkylene glycol, adding aqueous alkaline solution to the mixture to remove the residual hydrogen halide and unreacted benzoyl halide, and thereafter washing the polyalkalene glycol dibenzoate thus formed with water.

10. Compound having the formula:

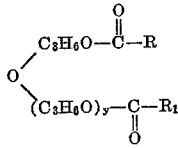

where $y$ represents an integer of 1 to 15 and R and $R_1$ represent radicals selected from the group consisting of phenyl and chlorine substituted phenyl.

11. Compound as claimed in claim 10 where R and $R_1$ represent phenyl.

12. Compounds as claimed in claim 10 where R and $R_1$ represent a chlorine substituted phenyl.

13. Compounds as claimed in claim 10 where R represents a phenyl and $R_1$ represents a chlorine substituted phenyl.

14. A compound: dipropylene glycol dibenzoate.

15. A dibenzoate of a polypropylene glycol.

16. A dizenzoate of tripropylene glycol.

17. A dipropylene glycol benzoate chlorobenzoate.

18. A compound: dipropylene glycol bis-meta-chlorobenzoate.

19. A compound: dipropylene glycol benzoate-meta-chlorobenzoate.

20. The combination with a plasticizable organic substance selected from the group consisting of water insoluble vinyl resins, water insoluble cellulose esters and water insoluble cellulose ethers, of a liquid plasticizer having the following formula:

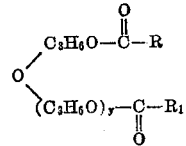

in which $y$ represents an integer of 1 to 15, and R and $R_1$ represent phenyl.

21. The combination as claimed in claim 20 wherein R and $R_1$ represent chlorine substituted phenyl.

22. The combination as claimed in claim 20 where R represents a phenyl and $R_1$ represents a chlorine substituted phenyl.

23. A plasticized composition comprising polyvinyl chloride and dipropylene glycol dibenzoate.

24. A plasticized composition comprising cellulose acetate and dipropylene glycol dibenzoate.

25. A plasticized composition comprising ethyl cellulose and dipropylene glycol dibenzoate.

26. A plasticized composition comprising cellulose nitrate and dipropylene glycol dibenzoate.

27. A plasticized composition comprising a vinyl chloride-vinylacetate copolymer and dipropylene glycol dibenzoate.

28. A plasticized composition comprising polyvinyl chloride and dipropylene glycol bis-chlorobenzoate.

29. A plasticized composition comprising polyvinyl chloride and dipropylene glycol benzoate chlorobenzoate.

References Cited in the file of this patent

UNITED STATES PATENTS

| | | |
|---|---|---|
| 2,070,331 | Derby | Feb. 9, 1937 |
| 2,480,185 | Fife et al. | Aug. 30, 1949 |

FOREIGN PATENTS

| | | |
|---|---|---|
| 496,574 | Great Britain | Dec. 1, 1938 |

OTHER REFERENCES

Heim et al.: "Journal of Organic Chemistry," volume 9, pages 299–301 (1944).

Industrial & Engineering Chemistry article by Emerson et al., volume 42, No. 7, July 1950, pages 1431–1433.